United States Patent Office 2,749,347
Patented June 5, 1956

2,749,347

2-PHENYLQUINOLINE-3-ARYL CARBAMATES

Frank J. Kreysa, Richmond Hill, N. Y., assignor to Chemo Puro Manufacturing Corporation, Long Island City, N. Y., a corporation of New York No Drawing. Original application October 30, 1952, Serial No. 317,820. Divided and this application December 16, 1953, Serial No. 405,233

4 Claims. (Cl. 260—287)

The present invention relates to antidiuretics and more particularly to the synthesis of new derivatives of 3-hydroxy-2-phenylcinchoninic acid (HPC) and the carboxylic acid derivative 3-hydroxy-2-phenylquinoline-4,8-dicarboxylic acid. This is a division of my co-pending application Ser. No. 317,820, filed October 30, 1952, and now abandoned.

Heretofore, it has been shown that the administration of 3-hydroxy-2-phenylcinchoninic acid, also known as 3-hydroxy-cinchophen, to dogs has inhibited water diuresis.

"Diuresis," of course, means the excretion of urine, but the term is generally used to signify an increase in the formation and excretion of urine. The above cinchoninic acid derivative can also be called an antidiuretic, since by definition, an antidiuretic is any compound that produces a decrease in urine volume or diuresis after water has been administered.

Similarly it is of interest to note that 3-hydroxy-2-phenylcinchoninic acid now called by many investigators HPC, has a carboxylic derivative which is much more powerful in its antidiuretic effect. This compound is called 3-hydroxy-2-phenylquinoline-4,8-dicarboxylic acid. Ordinarily, its use is somewhat limited due to the difficulty and expense in the preparation of one of its reactant materials, namely 2,3-diketoindoline-7-carboxylic acid, (isatin-7-carboxylic acid), which when condensed with phenacyl acetate gives the desired product.

The antidiuretic activity of these cinchoninic acid derivatives has been especially found to be useful in cases of diabetes insipidus. In the disease known as diabetes insipidus the patient passes larger quantities of watery dilute urine and suffers very intense thirst as a consequence. Clinical studies of HPC and 3-hydroxy-2-phenylquinoline-4,8-dicarboxylic acid have further revealed that these compounds reduce water output in cases of human diabetes insipidus. It has also been known that HPC and the 8-carboxylic derivatives of HPC affect the water output in diabetes insipidus, not by direct action on the water reabsorbing element in the tubules of the kidney, but rather by mediation of HPC on the pituitary system in the production of the antidiuretic hormone therein.

HPC has also been tested for its effect on renal secretion of phenol red and penicillin. It was found that HPC inhibits the secretion by the renal tubule of phenol red and penicillin. The implication of this effect is obvious, in that certain diseases necessitate that the above compounds remain at the site of action so as to function best. It is known that HPC reduces the ascorbic acid content of the rat adrenal gland when the anterior pituitary is present and also that HPC increases the excretion of uric acid from the blood. These facts suggested that HPC might be effective in diseases which respond to ACTH. HPC was therefore tested for its effects in acute rheumatic fever and chronic rheumatoid arthritis.

The effect of HPC upon fever and arthritis on 10 patients with rheumatic fever was dramatic. The fever was shown to subside immediately or in some patients within 6 hours. As for arthritis associated with rheumatic fever, tenderness and joint pain were relieved in all instances about as rapidly as the fever, but the objective signs of swelling persisted in some for about 24 hours. Of the 10 patients treated with HPC for rheumatoid arthritis, only 2 cases showed objective improvement.

HPC cannot be considered an antipyretic, in that it does not give any antipyretic effect in certain non-rheumatic fevers, but rather HPC should be considered as enhancing in some way, the output of activity of anterior pituitary, or adrenal cortical hormones.

In the latest paper on HPC, Jager (Bull., Johns Hopkins Hosp. (Feb. 1952), p. 121), has shown that HPC has the ability to stimulate the adrenal gland by way of the pituitary. He further lists its toxic reactions, which are present in about 20% of the patients tested. He also shows that HPC has a high protein-binding property with albumin.

Since the side effects of the drug are nausea, vomiting, drug fever, and abdominal cramps, it is to be noted at this point that the toxicity of HPC and 3-hydroxy-2-phenylquinoline-4,8-dicarboxylic acid is significant enough so as to warrant further investigation into modification of its structures. However, in the modification of their structures it is important that there be no radical change from their basic structures, but rather a modification that would help cut down toxicity, perhaps by slower absorption, and yet retain all the beneficial effects associated with HPC.

Accordingly, it is a primary object of the present invention to synthesize new derivatives of HPC and its 8-carboxylic acid derivative wherein the toxic reactions are substantially eliminated or of a negligible nature.

A secondary object of the present invention was to determine what group or groups, of the hydroxy, the carboxylic, and the phenyl groups, in the quinoline nucleus is or are absolutely essential in the production of the antidiuretic effect.

A further object of the present invention, after the determination of the group or groups from the foregoing object, is to maintain the necessary group or groups in the position effecting the antidiuretic effect and to modify the other groups or group so as to result in derivatives having the desired antidiuretic property, and having good solubility, slow absorption and diminished toxic effect in the body.

Various other objects, advantages and uses of the present invention will become apparent from the detailed description to follow.

To establish that a group or groups is or are absolutely essential in the production of the antidiuretic effect would be to insure its presence when the synthesis of a possibly less toxic, antidiuretic cinchoninic acid derivative was prepared. Marshall and Blanchard (J. Pharmacol. and Exper. Therap., vol 95 (1949), p. 185), established in a series of tests that the hydroxy group in position No. 3 is absolutely required for the antidiuretic effect. These investigators tested various isomers and homologues of HPC.

Inasmuch as the data of Marshall, Blanchard and Dearborn (Bull., John Hopkins Hospital, vol. 86, No. 2 (Feb. 1950), p. 90), established the fact that the hydroxy group of the cinchoninic acid series had to be in position No. 3, the problem of synthesizing new derivatives resolved itself into maintaining the 3-hydroxy group and modifying either the carboxylic, the phenyl or the tertiary amino group. Since the carboxylic group is much more reactive it was decided to prepare derivatives of the acid of HPC and 3-hydroxy-2-phenylquinoline-4,8 dicarboxylic acid. Thus, the derivatives, once prepared, and if administered, had to fulfill the requirements of complete reversion to be the mother compound (either to HPC or 3-hydroxy-2-phenylquinoline-4,8-dicarboxylic acid), have good solubility, slow absorption and diminished toxic effect in the body. The preparations of the esters of the carboxylic group seemed to fit the requirements best. Since HPC and its 8 carboxylic acid derivative, when given by mouth are absorbed by the intestine which has an alkaline pH, it was conceived that the esters would be slowly saponified to the alkaline acid salt and the free alcohol. Also it was assumed that since the saponification by the intestine is slow, the toxicity of the free acid would be diminished in intensity if not completely, and that its effects would last over a longer period of time. As far as the problem of toxicity of the alcohols liberated from the esters are concerned, they would be either oxidized to the corresponding acids or to $CO_2$ and water by the body. If the alcohols reverted to the corresponding fatty acids, instead of $CO_2$ and water, it would be noted that the toxicity of the normal fatty acids decreases gradually from $C_1$ to $C_5$ and then increases rapidly to $C_9$. Therefore it was decided to prepare the low carbon ester series of HPC and 3-hydroxy-2-phenylquinoline-4,8-dicarboxylic acid.

Another problem existed with regard to the preparation and methods to be employed in the synthesis of urethane derivatives of 3-hydroxy-2-phenylquinoline.

Since the 3-hydroxy position of the 2-phenyl-cinchoninic acid has previously been shown to be the group that effected biological activity most, it was considered that the preparation of various carbamates by the action of various aryl isocyanates on the phenolic group might prove to be of possible worth in cancer theraphy. Inasmuch as the carboxylic group might prove to be an interfering constituent in the preparation of these urethanes, the compound HPC was first decarboxylated, and then reacted with different isocyanates.

As has been shown by previous investigators, urethane (ethyl carbamate) $NH_2COOC_2H_5$ has an inhibiting effect on certain cancerous tissues. It has been shown that in hanging drop cultures of fibrocytes 0.1–0.5% of urethane first stimulated then retarded cell mitosis. Another investigator has shown that urethane has an inhibiting action on leukemia. Still others have shown that in the chemotheraphy of leukemia on mice with radioactive carbonyl-labeled urethane, that the mice with advanced lymphoid leukemia and also mice with mammary carcinoma, retained more radioactivity 24 hours after injection than normal mice, and that cellular growth was somewhat diminished. These facts, in addition to a tremendous amount of material in the literature on carbamates and their derivatives as possible cancer inhibitors, has led me to synthesize some urethane derivatives of 2-phenyl-3-hydroxyquinoline. The foregoing is suggestive rather than exhaustive of the possible uses in medicine of the various derivatives to be produced.

In the method of Hanns and Frankel (J. Prakt. Chem., vol. 133 (1932), pp. 259–72) the preparation of 3-hydroxy-2-phenylcinchoninic acid involved the use of phenacyl bromide. In following this method it was found that the yield was so low as to be impractical in preparing a large batch. Accordingly, phenacyl acetate was used instead of phenacyl bromide, by which Marshall and Blanchard (J. Pharmacol. and Exper. Therap., vol. 95 (1949), pp. 185–90) reported a yield of 82%. Due to the fact that phenacyl bromide is relatively less expensive than phenacyl acetate, the latter was prepared according to the method of Cebrain (Anales real. Soc. espon. fis. y quin., vol. 44, Ser. B (1948), p. 587) as follows:

To 120 gm. of phenacyl bromide dissolved in 400 cc. of hot ethyl alcohol was added, contained in a one liter beaker, a saturated alcoholic solution of 64 gm. of fused sodium acetate. The solution was then allowed to stand 24 hours at room temperature. The precipitated sodium bromide was filtered, and the filtrate was heated on a water bath in order to remove the ethyl alcohol. The solution, when evaporated to about 150 cc., was poured into 200 cc. water so as to dissolve any excess sodium acetate and sodium bromide. The solution was chilled, and the phenacyl acetate solidified. The solidified phenacyl acetate was then recrystallized from ligroin and white flat crystals separated which were filtered and dried in a dessicator over paraffin and sulfuric acid. The melting point was 50° C. and the yield as 79%.

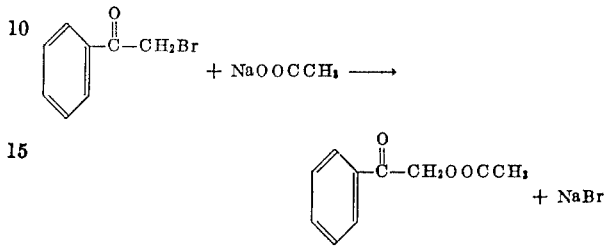

3-hydroxy-2-phenylcinchoninic acid was thereafter prepared as follows:

The minimal quantity of solution of 42 gm. of 97.7% sodium hydroxide in 135 cc. of water necessary to effect solution was added to a suspension of 36.7 gm. (0.25 mole) of isatin in 300 cc. of water contained in a 3 liter flask. To the solution obtained, was added first, a solution of 45.4 gm. (0.25 mole) of phenacyl acetate in 250 cc. of warm ethanol and then the remainder of the solution of sodium hydroxide. The mixture was refluxed over a free flame for 3 hours and allowed to remain at room temperature overnight. It was then diluted with 700 cc. of water and filtered to remove some tarry material. To the filtrate, with constant stirring there was added in order, 83 cc. of concentrated hydrochloric acid and 28 cc. of glacial acetic acid. After remaining at room temperature overnight, the precipitated product was collected upon a 150 mm. Buckner funnel washed with four 50 cc. portions of cold water and transferred to a 3 liter beaker containing 900 cc. of water. The solid was brought into solution by the addition of 20 cc. of 28% ammonia water and filtered from a slight amount of insoluble material. To the filtrate 50 cc. of 6 N acetic acid was added and, after several hours at room temperature, the product was separated by filtration, washed with four 75 cc. portions of water, dried at room temperature for a week, and then at 60° until constant weight was attained. The reason that the acid was first dried at room temperature was that the compound formed unstable hydrates which lost water quite readily at room temperature. If the compound was dried in an oven without preliminary air drying, evidence of partial decomposition was detectable. The yield was 52.1 gm. (78.9% of theoretical) of deep yellow microcrystalline product, melting point 206–7° C. with decomposition.

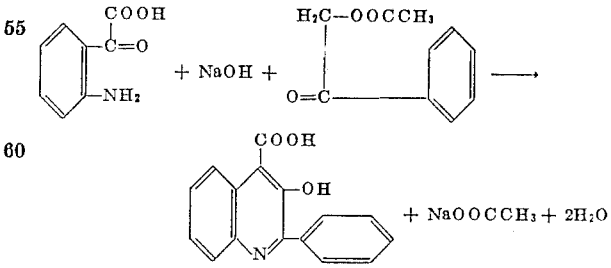

*Preparation of n-alkyl ester derivatives of 3-hydroxy-2-phenylcinchoninic acid*

METHYL-3-HYDROXY-2-PHENYLCINCHONINATE

To 2.0 gm. (.006 mole) of 3-hydroxy-2-phenylcinchoninic acid contained in a 125 cc. flask, was added 10 cc. of absolute methanol (.2 mole) and .5 cc. of concentrated sulfuric acid. The mixture was then heated over a steam bath under reflux. After heating 1 hour, the solid yellow acid completely dissolved, giving a dark brown solution. The heating was continued for an additional 4 hours. The solution was cooled and diluted with 30 cc. of cold water. An oily brown layer formed, which hardened upon shaking. Some yellow precipitate also settled out. This was probably the unreacted 3-hydroxy-2-phenylcinchoninic acid. The solution was made alkaline with ammonia water, and with the change in pH the yellow solid went into solution. Extraction was then carried out with three 20 cc. portions of ethyl ether. The ether solution was washed with 10 cc. water with subsequent separation from the ether layer. Drying of the ether solution over anhydrous potassium carbonate was continued for 30 minutes and decanted from the solid potassium carbonate. The ether solution was then evaporated over a hot-water bath to a volume of 10 cc. Crystallization set in after several hours giving .8 gm. of long light yellow needles whose melting point was 104–5° C., corrected. The yield was 38.1% of theoretical.

*Analysis.*—Calculated for $C_{17}H_{13}N_1O_3$:

Theory:
C=73.09%
H= 4.69%
N= 5.02%

Found:
C=72.93%
H= 4.75%
N= 4.91%

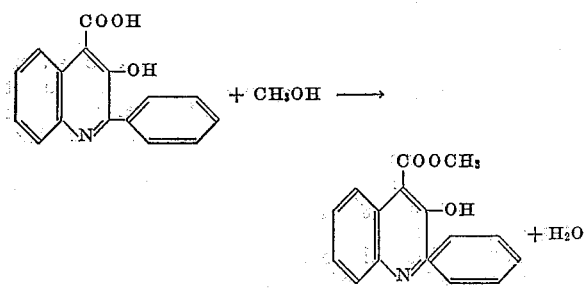

*Preparation of ethyl-3-hydroxy-2-phenylcinchoninate*

Into a dry 125 cc. Erlenmeyer flask containing 10 cc. of absolute ethanol (.2 mole) was added 2.0 gm. (.006 mole) of 3-hydroxy-2-phenylcinchoninic acid and 0.6 cc. of concentrated sulfuric acid. The mixture was then heated under a reflux over a steam bath for 5 hours. At the end of half an hour, the acid had completely dissolved giving a brown solution. The solution was then cooled and to it was added 30 cc. of cold water. A slight amount of yellow precipitate settled out as well as some oil, which hardened to a brown solid upon shaking. Ammonia water was then added to the solution until it was alkaline to pH paper. Extraction was then carried out with three 25 cc. portions of ethyl ether. The ether layer was then washed with 10 cc. of cold water, separated from the water layer, dried over anhydrous potassium carbonate for 30 minutes, and then decanted from the solid potassium carbonate. Then the ether solution was evaporated to a volume of 10 cc. on a water bath. Crystallization set in after 24 hours giving .9 gm. long lemon yellow needles whose melting point was 110–111° C., corrected. The yield was 40.9% of theoretical.

*Analysis.*—Calculated for $C_{18}H_{15}N_1O_3$:

Theory:
C=73.71%
H= 5.15%
N= 4.71%

Found:
C=73.94%
H= 4.99%
N= 4.80%

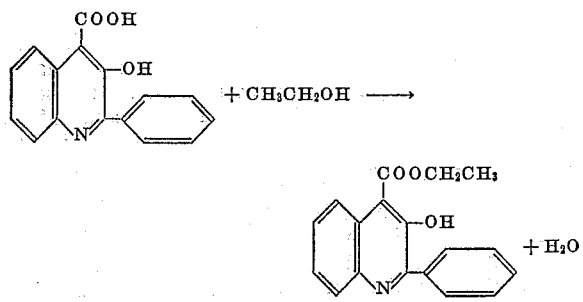

*Preparation of ethyl-3-hydroxy-2-phenylcinchoninate from silver salt and ethyl bromide*

To .2 gm. of silver-3-phenylcinchoninate and 2 cc. of dry ethyl bromide suspended in 50 cc. of dry benzine, in a 200 cc. beaker, there was placed a stirrer, which was rotated for two hours. The silver salt did not seem to react, and so the solution was transferred to a 150 cc. flask equipped with a reflux condenser and heated for 2 hours. This solution was allowed to stand overnight. The solution was filtered and the filtrate was distilled to a final volume of about 10 cc. The filtrate was then allowed to stand over 3 cc. of water for a few days. Long, light yellow crystals formed and these were filtered and dried. This gave .07 gms. (43.8% of theoretical) of ethyl-3-hydroxy-2-phenylcinchoninate melting at 110° C., corrected. This compound was identical with the ethyl ester prepared by the sulfuric acid method.

*Analysis.*—Calculated for $C_{18}H_{15}N_1O_3$:

Theory:
C=73.71%
H= 5.15%
N= 4.71%

Found:
C=73.82%
H= 4.97%
N= 4.73%

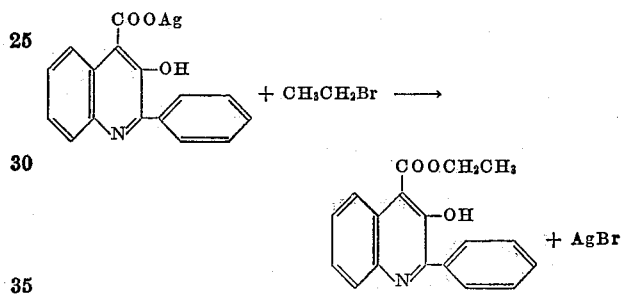

*Preparation of n-propyl-3-hydroxy-2-phenylcinchoninate*

To a dry 125 cc. Erlenmeyer flask containing 15 cc. of redistilled n-propanol (.3 mole) and .7 cc. of concentrated sulfuric acid was added 2.0 gm. (.006 mole) of 3-hydroxy-2-phenylcinchoninic acid. The solution turned, after heating 4 hours on a steam bath, to dark brown, but there still was much undissolved acid on the bottom of the flask. Since the reaction was not proceeding well, in that the acid did not dissolve, or that refluxing seemed evident, the steam bath was discarded and a direct weak flame used in its place. The heating was continued for two hours, and the solution cooled. 30 cc. of cold water was added to the solution and then made alkaline with ammonia water. Extraction was accomplished by three 25 cc. portions of ether, and the ether solution was dried for 30 minutes over anhydrous potassium carbonate. After decanting the ether solution from the solid potassium salt, the ether was evaporated on a hot water bath to a final volume of 20 cc. The filtrate was allowed to stand overnight, giving 1.1 gm. of pale yellow needles, melting at 75.3–75.5° C., corrected. The yield was 47.8% of theoretical.

*Analysis.*—Calculated for $C_{19}H_{17}N_1O_3$:

Theory:
C=74.24%
H= 5.56%
N= 4.56%

Found:
C=74.43%
H= 5.50%
N= 4.52%

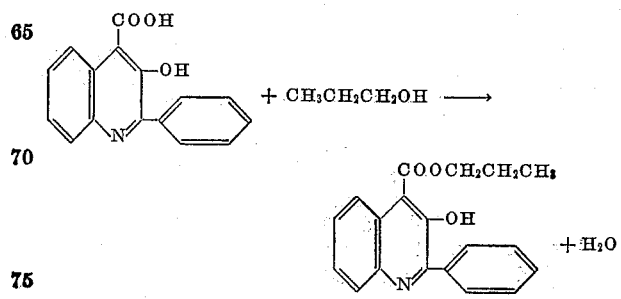

Preparation of n-butyl-3-hydroxy-2-phenylcinchoninate 2 gm. of 3-hydroxy-2-phenylcinchoninic acid (.006 mole) were added to a dry 125 ml. Erlenmeyer flask containing 15 cc. of n-butanol (.2 mole) and .8 gm. of concentrated sulfuric acid. The mixture was then heated on a water bath under reflux for 8 hours, giving a dark brown solution. The solution was cooled, diluted with 30 cc. of cold water, and made alkaline with ammonia water. Extraction was carried out with three 25 cc. portions of ether, which was subsequently washed with 10 cc. of cold water, and dried over anhydrous potassium carbonate. Evaporation of the ether followed decantation from the potassium carbonate solid, and after 24 hours of standing, no crystalline growth was observed. Since it was assumed that the ester was highly soluble in the butanol (extracted by the ether also) the complete solution was brought down to dryness on the steam bath. Before performing this operation however, ½ gm. of charcoal (Darco) was added to the solution and then filtered. It also was found that the addition of water to the filtrate would not precipitate the ester, since the solution was insoluble in water and 2 layers formed. To the residue was added 20 cc. of ethanol, and the mixture was heated to boiling in order to dissolve it. Solution was effected, and the brown alcoholic solution filtered. One cc. of water was added to the filtrate and a slight turbidity resulted. The solution was allowed to stand 24 hours and 0.69 gm. of light yellow crystals formed. Recrystallization was from acetone and alcohol (1:1) giving needles that melted at 74.5° C., corrected. The yield was 29.1% of theoretical.

*Analysis.*—Calculated for $C_{20}H_{19}N_1O_3$:

| Theory: | Found: |
|---|---|
| C=74.76% | C=74.89% |
| H= 5.96% | H= 6.03% |
| N= 4.36% | N= 4.29% |

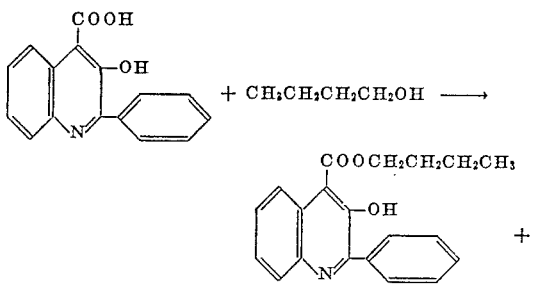

Preparation of n-amyl-3-hydroxy-2-phenylcinchoninate

Into a 125 cc. Erlenmeyer flask containing 2 gm. (.006 mole) of 3-hydroxy-2-phenylcinchoninic acid and 15 cc. (.3 mole) of n-amyl alcohol (1-pentanol) was added .7 gm. of concentrated sulfuric acid. The mixture was refluxed over a steam bath for 3 hours. Since after the 3 hours the mixture did not go completely into solution, the steam bath was discarded and a direct weak flame used in its place. The heating was continued for an additional 3 hours. Then the flask was cooled and diluted with 30 cc. of cold water. This gave an oily layer and some yellow crystals settled out. When the mixture was made alkaline however, the yellow solid dissolved. The solution was extracted with three 25 cc. portions of ether and washed with 10 cc. of cold water. Drying of the ether layer was made over anhydrous potassium carbonate for 30 minutes. The ether solution was then evaporated to dryness on a steam bath. Ethyl alcohol was used to dissolve the residue, and then filtered. Some yellow solid remained undissolved and its melting point was found to be 203°.

This is probably the unreacted 3-hydroxy-2-phenylcinchoninic acid which has a melting point of 206–7°. The dark filtrate was treated with .1 gm. of activated charcoal (Darco) and filtered. The filtrate, which had a total volume of about 15 cc., was then allowed to stand overnight and .7 gm. of light yellow needles settled out. Recrystallization was from ethyl alcohol which gave needles that melted at 73.5°–74.0° C., corrected. The yield was 24.1% of theoretical.

*Analysis.*—Calculated for $C_{21}H_{21}N_1O_3$:

| Theory: | Found: |
|---|---|
| C=75.17% | C=75.18% |
| H= 6.32% | H= 6.24% |
| N= 4.18% | N= 4.31% |

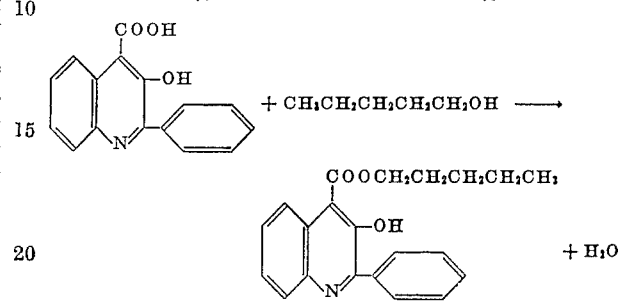

Preparation of silver-3-hydroxy-2-phenylcinchoninate

Initially, when esterification was attemped with hydrochloric acid as catalyst, instead of sulfuric acid, all attempts at preparing the esters failed. This fact cannot be explained except in assuming that the precent of HCl by weight to the alcohol was not sufficient so as to catalyze the reaction. The silver salts of the acids were therefore prepared in the hope that the reaction of the salt with the alkyl halide might prove more satisfactory in the preparing of esters.

To 2 gm. (.006 mole) of 3-hydroxy-2-phenylcinchoninic acid was added 40 cc. of water. The acid was then carefully neutralized by adding 1 cc. of concentrated ammonium hydroxide in 30 ml. of water which completely dissolved the acid. Then .3 gm. (slight excess) of silver nitrate dissolved in 30 ml. of water was added to the solution with vigorous stirring. Immediate precipitation occurred giving a heavy yellow precipitate. This was filtered and washed with cold water, until the wash solution gave a negative test with dilute hydrochloric acid. The salt was dried in the dark at room temperature in a desiccator over sulfuric acid. The yield was 2.1 gm. (75.0% of theoretical) of light brown fine crystalline salt which melted at 221.5° C., corrected, with decomposition.

*Analysis.*—Calculated for $C_{16}H_{10}O_3N_1Ag$:

| Theory: | Found: |
|---|---|
| C=51.61% | C=51.60% |
| H= 2.71% | H= 2.62% |
| Ag=29.00% | Ag=28.87% |

Preparation of the 2,3-diketoindoline-7-carboxylic acid

Methyl anthranilate was first prepared according to the method outlined by Beilstein (vol. 14, pp. 317, 531), and recrystallizing the same as taught by Long, U. S. Patent No. 2,517,691, August 8, 1950. Methyl isonitrosoacetoanthranilate was prepared from the methyl anthranilate by following the procedure of Waldman (J. Prakt. Chem., vol. 147 (1937), p. 338).

2,3-diketoindoline-7-carboxylic methyl ester was then prepared as follows:

Into 190 gm. of concentrated sulfuric acid, which was heated to 70° C., was slowly added, under strong agitation, 38 gm. of methyl isonitrosoacetoanthranilate in small portions, so that the temperature did not exceed 75° C. After complete solution of the solid, which gave a dark red color, the reaction mixture was heated for 10 minutes at 80° C. After cooling, the mixture was poured into 800 ml. of water and a brown precipitate formed. This was filtered, washed with three portions of 20 ml. of water and dried. 34.1 gm. of light brown crystals were collected and melted at 192° C., with decomposition.

Since Waldman (J. Prakt. Chem., vol. 147 (1937), p. 338) reported a melting point of 192° C., also, the compound was not recrystallized. The yield was 97.3% of theoretical.

Isolation of 2,3-diketoindoline-8-carboxylic acid was then effected as follows:

Into a 1000 ml. 3 necked flask equipped with a stirrer and a reflux condenser was added 34 gm. of isatin-8-carboxylic methyl ester and 400 cc. of 7.5% alcoholic potassium hydroxide. This mixture was then refluxed 5 hours, during which time much dark yellow solid came out of solution. The alcoholic solution was then evaporated on a steam bath, giving a final volume of about 50 ml. and the mixture was acidified with concentrated hydrochloric acid. The solution turned from yellow to orange and the precipitate was filtered off. The still wet precipitate was then treated with cold sodium bicarbonate solution until the solution was alkaline to pH paper. This operation was carried out so as to dissolve the isatin-7-carboxylic acid from the unhydrolyzed methyl ester. The orange colored solution was filtered, leaving a slight yellow residue. The acid was then isolated from the filtrate by acidification with hydrochloric acid. Recrystallization was accomplished from 3 liters of water giving large orange flat crystals melting at 275° C. The yield of isatin-7-carboxylic acid was 29.3 gm. (93.0% of theoretical).

*Preparation of 3-hydroxy-2-phenylquinoline-4,8-dicarboxylic acid*

In the preparation of this dicarboxylic acid derivative, the method used is that of Marshall et al. (Bull., Johns Hopkins Hospital, vol. 86, No. 2 (Feb. 1950), p. 95). To a solution of 32 gm. (0.18 mole) of phenacyl acetate in 100 cc. of warm ethanol was added a solution of 28.7 gm. (0.15 mole) of 2,3-diketoindoline-7-carboxylic acid in 150 cc. of 6 N sodium hydroxide contained in a 500 cc. flask. The mixture was then gently refluxed for 10 hours, left at room temperature overnight, and diluted with 300 cc. of water. Following removal of the ethanol by distillation, the mixture was diluted with water to a volume of approximately 1 liter, and filtered through a bed of glasswool to remove tarry by-products. The filtrate was treated with 150 cc. of 6 N hydrochloric acid and left at room temperature for 3 hours. The precipitated product was collected, washed with water, and dissolved in a mixture of 500 cc. of warm water and 30 cc. of 6N ammonia water. The resulting solution was stirred with decolorizing carbon (3 gm. Darco), filtered, precipitated by the dropwise addition of 30 cc. of 6 N hydrochloric acid and left at room temperature overnight. The precipitated product was collected, washed with five 10 cc. portions of water and dried at 37° C. for 3 days. The dry product was pulverized, boiled for a few minutes with 50 cc. of ethanol, separated from the solvent by filtration, washed with ethanol and dried, first in an evacuated desiccator over sulfuric acid for 24 hours and then at 105° C. for 2 hours. Yield was 26.1 gm. (83.2% of theoretical) of pale yellow product. Upon taking its M. P., the color began to darken at 270° C. becoming progressively darker as the temperature was raised to 305° C. when the dark mass melted, with decomposition.

*Preparation of di-n-alkyl esters of 3-hydroxy-2-phenylquinoline-4,8-dicarboxylic acid.*

DIMETHYL-3-HYDROXY-2-PHENYLQUINOLINE-4,8-DICARBOXYLATE

Into a 125 ml. dry Erlenmeyer flask containing 1 gm. of 3-hydroxy-2-phenylquinoline-4,8-dicarboxylic acid (.003 mole), and 10 cc. of absolute methanol (.2 mole) was added .5 cc. of concentrated sulfuric acid. The solution was then refluxed for 6 hours under a steam bath and then cooled. To the dark brown solution was added 30 ml. of cold water. This operation gave an oily layer, with some yellow crystals settling out. However, as soon as the solution was made alkaline with ammonium hydroxide, the yellow crystals dissolved. The solution was then extracted with three 25 ml. portions of ether, and the extract was washed with 10 ml. of cold water, and dried over anhydrous potassium carbonate. The decanted ether solution was then evaporated on a hot water bath to 10 ml. The solution, after several hours, gave .5 gm. (45.5% of theoretical) of orange crystals which melted at 118.5° C. corrected, when recrystallized from ethanol.

*Analysis.*—Calculated for $C_{19}H_{15}N_1O_5$:

Theory:
C=67.65%
H=4.47%
N=4.15%

Found:
C=67.60%
H=4.62%
N=4.20%

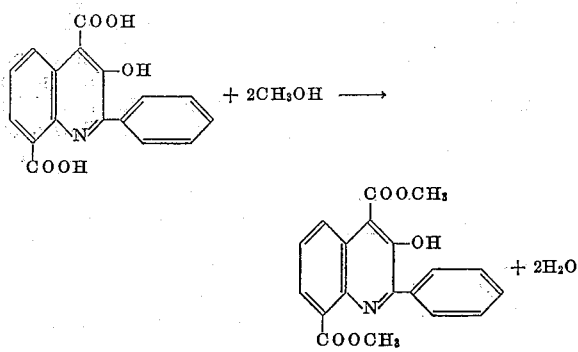

*Diethyl - 3 - hydroxy - 2 - phenylquinoline - 4,8 - dicarboxylate*

One gm. of 3-hydroxy-2-phenylquinoline-4,8-dicarboxylic acid (.003 mole) was added to a dry 125 ml. Erlenmeyer flask containing 15 cc. of absolute ethanol (.3 mole) and .5 cc. of concentrated sulfuric acid. The solution was then refluxed on a steam bath for 6 hours and cooled. To the dark brown solution was added 30 ml. of cold water, giving an immediate solid oily layer and some yellow precipitate. The yellow precipitate disappeared upon the addition of ammonium hydroxide which gave the solution a pH of 11. Extraction of the solution with three 25 cc. portions of ether then followed. The drying of the ethereal solution was accomplished over anhydrous potassium carbonate for 30 minutes. The solution was decanted, and the ether evaporated on a hot water bath to a volume of 10 ml. (54.6% of theoretical). After standing overnight, the solution gave .6 g. of long rectangular dark yellow crystals which melted at 121.0° C., corrected.

*Analysis.*—Calculated for $C_{21}H_{19}N_1O_5$:

Theory:
C=69.03%
H=5.20%
N=3.80%

Found:
C=69.21%
H=5.04%
N=3.76%

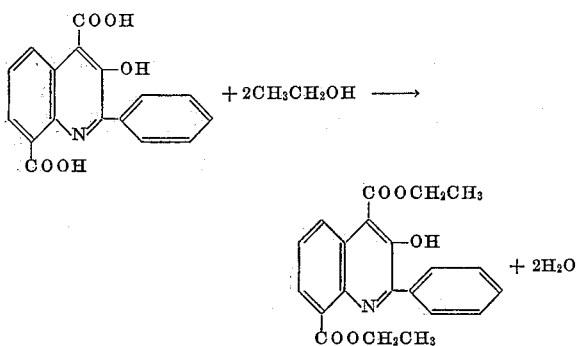

*Preparation of Di n-propyl-3-hydroxy-2-phenylquinoline-4,8-dicarboxylate*

To a 125 ml. dry Erlenmeyer flask containing 1 gm. of 3-hydroxy-2-phenylquinoline-4,8-dicarboxylic acid (.003 mole) was added 15 cc. of redistilled n-propanol (.3 mole) and .6 cc. of concentrated sulfuric acid. The solution was then refluxed 7 hours under a steam bath and then cooled. Dilution of the solution was effected by 30 ml. of cold water, which produced some yellow precipitate. However, when the solution was made alkaline with ammonium hydroxide, the yellow precipitate dissolved. Extraction was accomplished with three 25 ml. portions of ether and the extract was washed with 10 ml. of water. The ether solution was dried over anhydrous potassium carbonate for 30 minutes and decanted into a beaker and evaporated over a hot water bath to a volume of 20 ml. The solution was allowed to lay overnight, but only dark oily droplets formed. Thus, the oily droplets and solution were dissolved in 10 ml. of ethanol, and treated with 1 gm. Darco (decolorizing charcoal). The solution was filtered and the filtrate was left standing overnight. Inasmuch as no crystals settled out of the dark brown solution, some water was added until a slight turbidity formed. The solution was stirred for several minutes and allowed to lay overnight. Next day .5 gm. (41.6% of theoretical) of long light yellow crystals formed, which melted at 86.5–87.0° C., corrected.

*Analysis.*—Calculated for $C_{23}H_{23}N_1O_5$:

| Theory: | Found: |
|---|---|
| C=70.12% | C=70.16% |
| H=5.90% | H=6.05% |
| N=3.56% | N=3.51% |

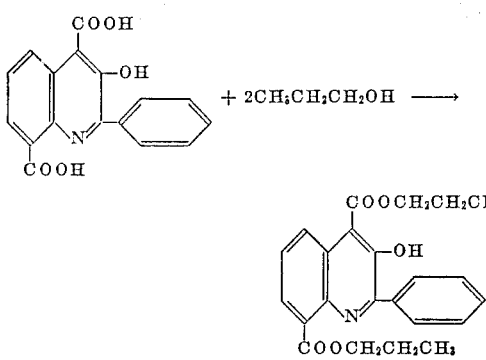

*Preparation of n-dibutyl-3-hydroxy-2-phenylquinoline-4,8-dicarboxylate*

One gm. of 3-hydroxy-2-phenylquinoline-4,8-dicarboxylic acid (.003 mole) was added to a dry 125 ml. Erlenmeyer flask containing 15 ml. of n-butanol (.25 mole) and .6 ml. of concentrated sulfuric acid. The solution was then refluxed on the steam bath for 10 hours and cooled. To the dark brown solution was added 30 ml. of cold water and then concentrated ammonium hydroxide until the pH was about 11. Extraction of the solution with three 25 ml. portions of ether then followed. The ethereal solution was then dried over anhydrous potassium carbonate for 30 minutes and then decanted into a 300 ml. beaker. The solution was evaporated to a volume of 20 ml. and left standing overnight, which gave a thick viscous oily residue. Since the viscous material was due to possibly tarry material, the oily residue was dissolved in 20 cc. of ethanol and treated with 1 g. of Darco charcoal. The solution was filtered, and 3 ml. of water was added, which gave a heavy yellow turbidity. The solution was allowed to stand overnight, but only an oily layer formed. The solution and oily layer were then dissolved in 10 ml. n-butanol and again treated with 1 gm. of activated charcoal (Darco). A clear filtrate resulted and this solution was then diluted with 3 cc. of ethyl alcohol stirred for several minutes and allowed to stand. After 3 days, .6 gm. (46.1% of theoretical) of long lemon yellow crystals formed, which melted at 59.5–60.0° C., corrected.

*Analysis.*—Calculated for $C_{25}H_{27}N_1O_5$:

| Theory: C=71.21% | Found: C=71.39% |
|---|---|
| H=6.46% | H=6.56% |
| N=3.32% | N=3.18% |

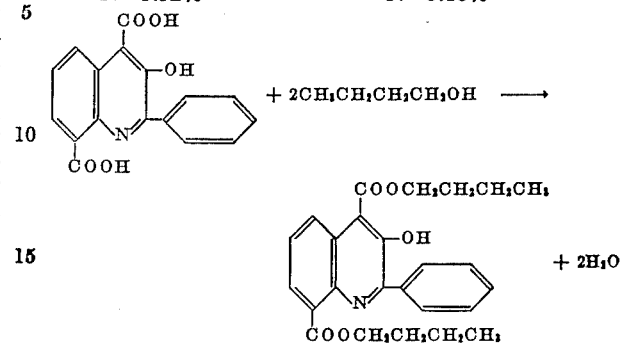

*Preparation of silver-3-hydroxy-2-phenylquinoline-4,8-dicarboxylate*

Into a 200 ml. beaker containing 40 ml. of water was placed 1 gm. of 3-hydroxy-2-phenylquinoline-4-8-dicarboxylic acid (.003 m.). Then a solution of 1 cc. of concentrated ammonium hydroxide dissolved in 30 cc. of water was added to the suspended acid giving a pH of 7 to the solution. The solid acid dissolved immediately, except for a slight trace of yellow precipitate which was then filtered off. To the solution was then added .3 gm. of silver nitrate dissolved in 30 cc. of water. A heavy yellow precipitate formed, which was filtered and washed with water. The filtrate was tested with dilute hydrochloric acid, and the washing ceased when the hydrochloric acid gave a negative test for silver. The silver salt was dried in the drak in a desiccator over sulfuric acid. The yield was 1.1 gm. (64.7% of theoretical) of dry dark brown crystals which did not melt under 315° C.

*Analysis.*—Calculated for $C_{17}H_9O_5N_1Ag_2$:

| Theory: C=38.04% | Found: C=38.17% |
|---|---|
| H=1.73% | H=1.80% |
| Ag=41.26% | Ag=41.31% |

*Preparation of 3-hydroxy-2-phenylquinoline*

The decarboxylation of 3-hydroxy-2-phenylcinchoninic acid was accomplished quite easily by using the method of Dilthey and Thelen (Ber., vol. 58B (1925), p. 1588–9). To 10 gm. of 3-hydroxy-2-phenylcinchoninic acid contained in a 125 ml. Erlenmeyer flask, was added 30 ml. of nitrobenzene. The flask under reflux, was then heated by a direct flame for 3 hours. The volume of the nitrobenzene solution was brought down to about 15 cc. by heating on a hot plate near a hood. A tan precipitate crystallized out and was filtered giving 6.1 gm. of solid. The melting point of the alkali soluble 3-hydroxy-2-phenylquinoline was found to be 223° C. Dilthey and Thelen gave a melting point of 220° C., while Bargellini and Berlingozzi (Gazz. Chim. Ital., vol. 53 (1923), p. 3) reported 221–222° C. and Henze and co-workers (J. A. C. S., vol. 70, (1948), pp. 2622–4) 228° C. The picrate of 3-hydroxy-2-phenylquinoline was thus prepared and gave a melting point of 238° C. with decomposition. This melting point agreed with that given by Bargellini who gave a range of 235–38° C., while Henze gave a melting point of 245° C., which was slightly higher.

*Preparation of carbamates of 3-hydroxy-2-phenylquinoline*

PREPARATION OF 2-PHENYLQUINOLINE-3-PHENYL-CARBAMATE

To a dry 9 x ½ inch "Pyrex" test tube was added .5 gm. of 3-hydroxy-2-phenylquinoline and .5 ml. of phenylisocyanate. The liquid phenylisocyanate however, only seemed to moisten the hydroxy compound. Therefore, 5 ml. of dry benzene was added to the test tube, and the solution was heated on a steam bath, protected with a calcium chloride tube. The reaction did not seem to go, in that the compound did not dissolve, so 2 drops of pyridine were added to act as catalyst. The solution was heated for another 5 minutes, and cooled. The benzene solution, with its solid residue was dissolved in 30 ml. of benzene and filtered. A slight amount of white solid remained whose melting point was 233° C. This was probably diphenyl urea, melting point 238° C. The benzene filtrate was evaporated to about 8 cc. and a gray solid precipitated, melting point 162–70°. Since the compound was quite obviously contaminated, the solid was dissolved in 25 cc. of carbon tetrachloride assuming that if the impurity were diphenyl urea, it would be insoluble in carbon tetrachloride and so separated. The solution was filtered from a slight amount of residue and the filtrate was evaporated to dryness. The residue was then dissolved in 20 ml. of ethyl acetate and fine white crystals formed when 10 ml. of petroleum ether was added. .2 gm. of product was isolated melting at 162.0° C., corrected.

*Analysis.*—Calculated for $C_{22}H_{16}N_2O_2$:

Theory: C=77.61%  Found: C=77.48%
H=4.74%  H=4.59%
N=8.24%  N=8.34%

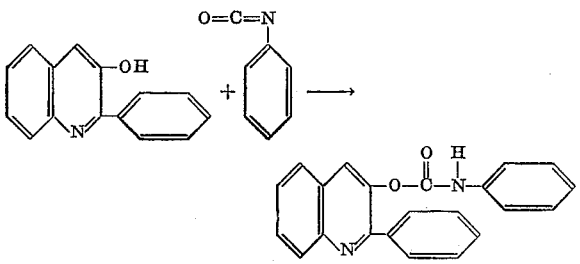

*Preparation of 2-phenylquinoline-3-(1 naphthylcarbamate)*

Inasmuch as the phenol was not too soluble in carbon tetrachloride, benzene or ligroin, .5 gm. of 3-hydroxy-2-phenylquinoline and .5 cc. of alpha-naphthyl isocyanate were heated directly by a low flame in a dry 9 x ½ inch Pyrex test tube. Previous to heating, 2 drops of pyridine had been added to act as a catalyst. This heating operation was performed so as to effect reaction, since a water bath had proved completely inadequate. The "Pyrex" test tube was taken away from the flame as soon as solution was effected, and left at room temperature, sealed by a rubber cork. As soon as the dark liquid solidified the heating was repeated until liquid again. This operation was repeated several times. The dark residue was then dissolved in 10 ml. of carbon tetrachloride, giving a dark brown solution. Evaporation of the solution to 4 ml. gave a tan crystalline product. The product was dissolved in 20 ml. of carbon tetrachloride and filtered. The volume was evaporated to 10 ml., and 5 ml. of petroleum ether was added. Immediate turbidity resulted, and after several hours, a light tan product (.3 g.) was filtered and recovered, melting point 143–4° C.

*Analysis.*—Calculated for $C_{26}H_{18}N_2O_2$:

Theory:  Found:
C=79.97%  C=79.95%
H=4.65%  H=4.85%
N=7.17%  N=7.20%

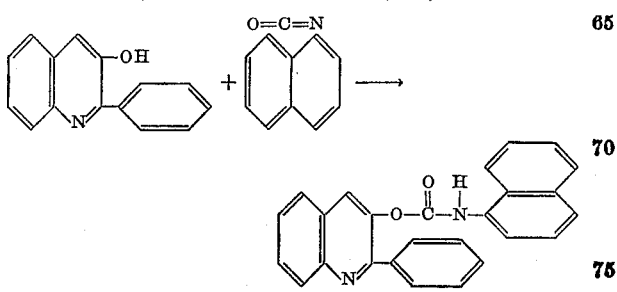

*Preparation of 2-phenylquinoline-3-(2 naphthylcarbamate)*

To .5 gm. of 3-hydroxy-2-phenylquinoline was added .5 gm. of beta-naphthyl-isocyanate contained in a ½ x 9 inch dry "Pyrex" test tube. The solid mixture was heated directly over a low flame until the solids melted. The flame was taken away, and the test tube stoppered. Within a few minutes the liquid melt solidified. The test tube was again heated until the solid melted, and then the flame was taken away. The dark brown melt was dissolved in ethyl acetate and filtered from a slight amount of white residue. Evaporation of the ethyl acetate filtrate to 30 ml. was then accomplished on a hot plate and the solution cooled. Petroleum ether was added until crystallization began, and the solution was allowed to stand several hours. Light tan crystals formed, which were filtered, giving .8 gm. of product melting at 181.0–5° C.

*Analysis.*—Calculated for $C_{26}H_{18}N_2O_2$:

Theory:  Found:
C=79.97%  C=80.01%
H=4.65%  H=4.58%
N=7.17%  N=7.26%

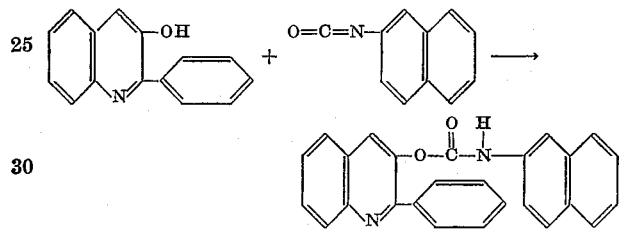

Accordingly, it is believed that derivatives have been synthesized having antidiuretic properties and it is thought that the foregoing objects have been fulfilled.

I claim:
1. An antidiuretic having the structural formula:

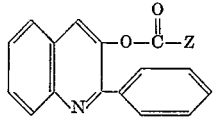

wherein Z is selected from the group consisting of:

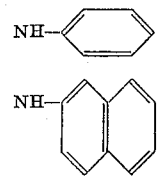

And

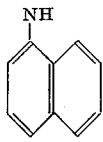

2. 2-phenylquinoline-3-phenylcarbamate.
3. 2-phenylquinoline-3-(1-naphthylcarbamate).
4. 2-phenylquinoline-3-(2-naphthylcarbamate).

References Cited in the file of this patent
UNITED STATES PATENTS
1,773,837   Wolffenstein _____ Aug. 26, 1930